Patented Jan. 4, 1949

2,458,191

UNITED STATES PATENT OFFICE 2,458,191

RESINOUS COMPOSITIONS OF STARCH ETHERS WITH OTHER RESINS

Peter L. Nichols, Jr., and Lee T. Smith, Philadelphia, Pa., assignors to the United States of America as represented by the Secretary of Agriculture No Drawing. Application January 26, 1945, Serial No. 574,668

4 Claims. (Cl. 260—17.4)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This application is a continuation in part of our copending application for patent, Serial No. 518,979, filed January 20, 1944, and now abandoned.

This invention relates to the preparation of improved resinous compositions, and more particularly to compositions of various resins, such as the acrylate and vinyl resins having improved properties.

We have found that by adding starch ethers, such as the unmixed starch ethers benzyl starch and allyl starch, to resins, resinous compositions having substantially improved properties can be obtained. We have also found that mixed ethers or ether-esters of starch such as methyl benzyl starch, ethyl benzyl starch, ethyl allyl starch, benzyl starch acetate, allyl starch acetate, can be added to resins to produce similar improvements. The expression "starch ethers" is employed in the generic sense, being inclusive of, for example, mixed starch ethers, unmixed starch ethers and starch ether-esters. The mixed resins thus obtained can be used in preparing lacquers, impregnating fibrous and porous materials, coating paper, and in preparing molded objects or rigid plastics.

The mixing of starch ethers with the resins can be effected either by dissolving them in a common solvent or by mixing them on a roller mill or other suitable mixer. The amount of ethers or ether-esters added will depend upon the use intended for the mixed resin, but in general not more than one part of ether or ether-ester should be added to one part of resin. Higher proportions of ether will often produce brittle compositions, although the addition of a plasticizer will overcome this effect to some extent. Ordinary plasticizers such as tri-o-cresyl phosphate or butyl phthalate are satisfactory.

Our invention is illustrated by the influence of starch ethers on acrylic ester polymers. The polymers of methyl and ethyl acrylate, for instance, are comparatively soft and tacky; their tensile strength is low; their softening temperature is low; their point of brittleness is high; and they are compatible with only a few other resins. All of these properties limit their use. We have found, on the other hand, that the addition of benzyl or allyl starch (1.4 to 2.4 allyl groups per glucose unit) to methyl and ethyl acrylate polymers (1) increases the tensile strength; (2) raises the temperature of softening; (3) lowers the temperature of brittleness; (4) reduces the tackiness; and (5) increases the hardness but retains flexibility. The resulting compositions have, accordingly, a substantially greater utility than the acrylate polymers used alone.

The following examples are representative of our invention:

Example I

Ninety parts of methyl acrylate (medium viscosity) dissolved in ethylene chloride was shaken with a solution of 10 parts of benzyl starch (2.2 benzyl groups per glucose unit) in ethylene chloride. The solvent was allowed to evaporate and the resultant film was baked 24 hours at 80° C. The resulting composition was opaque but appeared to be quite homogeneous in structure. It was tough and moderately flexible. The tensile strength of the original methyl acrylate was 700 p. s. i. The tensile strength of the methyl acrylate modified with benzyl starch was 3000 p. s. i. The brittle point determined by a standard test of the original methyl acrylate was approximately −5° C. The modified methyl acrylate had a brittle point near −40° C. The modified product softened 20° to 30° C. higher than the original methyl acrylate. In another experiment, a methyl acrylate polymer possessing considerable tack was mixed with benzyl starch. The resulting film was tack-free. Films of methyl acrylate and allyl starch were transparent and had essentially the same properties as those described for the methyl-acrylate-benzyl starch compositions.

Example II

One hundred parts of methyl methacrylate polymer and 25 parts of gummy allyl starch (approximately 2 allyl groups per glucose unit) were mixed on regular rubber compounding rolls for a ten-minute period. The resulting product was molded in a press for 10 minutes at 1500 lbs./sq. in. pressure and a temperature of 338° F. (100 lbs. steam-gauge pressure). The molded product was opaque and very hard.

Example III

One hundred parts of methyl methacrylate polymer and 5 parts of gummy allyl starch (approximately 2 allyl groups per glucose unit) were mixed on regular compounding rolls for a twelveminute period. The resulting product was molded in a press for ten minutes under the conditions described in Example II. The molded product had a slight haze.

Example IV

One hundred parts of polystyrene and 25 parts of gummy allyl starch (approximately 2 allyl groups per glucose unit) were mixed on regular rubber compounding rolls for a period of seventeen minutes. The resulting product was molded in a press under the conditions described in Example II. The molded product was opaque and hard.

Example V

One hundred parts of polyvinyl acetate (medium viscosity) and 25 gms. of gummy allyl starch (approximately 2 allyl groups per glucose unit) were mixed on regular compounding rolls for a fifteen-minute period. The resulting material was molded in a press ten minutes at 320° F. (75 lbs. steam-gauge pressure). The molded product was opaque and hard.

Having thus described our invention, we claim:

1. A process of improving the physical properties of a resin of the group consisting of lower alkyl acrylate and lower alkyl methacrylate polymers, polystyrene, and polyvinyl acetate; comprising mixing the resin with an allyl starch ether having about 1.4 to 2.4 ether groups per glucose unit.

2. A resinous product prepared by the process defined in claim 1.

3. A process of improving the physical properties of methyl acrylate polymer comprising incorporating therewith an allyl starch ether having about 1.4 to 2.4 ether groups per glucose unit.

4. A process of improving the physical properties of a lower alkyl acrylate polymer comprising incorporating therewith an allyl starch ether having about 1.4 to 2.4 ether groups per glucose unit.

PETER L. NICHOLS, JR.
LEE T. SMITH.

REFERENCES CITED

The following references are of record in the file of this patent:

UNITED STATES PATENTS

| Number | Name | Date |
|---|---|---|
| 2,163,305 | Dittmar | June 20, 1939 |
| 2,191,520 | Crawford | Feb. 27, 1940 |
| 2,265,937 | Dittmar | Dec. 9, 1941 |

FOREIGN PATENTS

| Number | Country | Date |
|---|---|---|
| 579,254 | Germany | June 22, 1933 |